United States Patent
Tamura et al.

(12)

(10) Patent No.: US 6,323,272 B1
(45) Date of Patent: Nov. 27, 2001

(54) POLYAMIDE RESIN COMPOSITION

(75) Inventors: Kenji Tamura, Yokohama; Hirofumi Inoue, Kawasaki; Junichi Nakamura, Kawasaki; Masayuki Noguchi, Kawasaki; Tsuguo Ebata, Yokohama, all of (JP)

(73) Assignee: EMS-Chemie AG, Reichenauerstrasse (CH)

( * ) Notice: Subject to any disclaimer, the term of this patent is extended or adjusted under 35 U.S.C. 154(b) by 0 days.

(21) Appl. No.: 09/637,658

(22) Filed: Aug. 11, 2000

(30) Foreign Application Priority Data

Aug. 13, 1999 (JP) .................................................. 11-229484

(51) Int. Cl.⁷ ................................ C08K 9/06; C08K 3/34
(52) U.S. Cl. ......................... 524/492; 523/209; 523/216; 523/443; 524/442; 524/447; 524/449
(58) Field of Search ..................................... 524/492, 442, 524/447, 449, 445; 523/209, 216, 443

(56) References Cited

U.S. PATENT DOCUMENTS 6,172,148 * 1/2001 Weber et al. ........................ 524/100

* cited by examiner

*Primary Examiner*—Ana Woodward
(74) *Attorney, Agent, or Firm*—Banner & Witcoff, Ltd.

(57) ABSTRACT

The invention provides polyamide resin compositions with good mechanical properties and dimensional stability during water absorption. Polyamide resin composition, comprising 100 parts by weight of resin contents composed of (A) 60 to 98% by weight of polyamide resin, (B) 40 to 2% by weight of polyolefine resin having dicarboxylic acid anhydride groups, as well as (C) 0.3 to 30 parts by weight of triazine-containing layered silicate with intercalated triazine compound derivatives with at least one positive charge.

2 Claims, No Drawings

POLYAMIDE RESIN COMPOSITION

BACKGROUND OF THE INVENTION

The present invention relates to polyamide resin compositions with good dimension stability during absorption and good mechanical properties.

SUMMARY OF THE INVENTION

Polyamide resis is employed widely, such as for various industrial parts. However, due to high water-absorption of the polyamide resins, there are disadvantages, e.g. reduction of strength due to water absorption and dimensional changes of molded articles.

To modify this behavior, adding polyolefin resins with low water absorption has been proposed. JP Patent Application Disclosure No. 11-181277 discloses polyamide resin compositions with improved dimensional stability during water absorption wherein lipophilic intercalation compounds of swelling silicate treated with tetraalkyl ammonium compounds are employed together with polyolefin to improve the dimensional stability during water absorption.

In the former method, a large amount of polyolefin resin is required to suppress dimensional changes due to water absorption, and consequently a reduction in strength and stiffness is unavoidable. In the latter method, lipophilic intercalation compounds are finely dispersed to suppress water absorption, and to improve dimensional stability, but the effect is not sufficient.

In view of said circumstances, the present invention has been made to provide polyamide resin compositions with good mechanical properties and dimensional stability during water absorption.

These and other objects, advantages and features of the invention will be set forth in the detailed description which follows.

DETAILED DESCRIPTION OF THE INVENTION

The present inventors have investigated the matter and found the triazine-containing layered silicates exhibit a larger reinforcing effect to polyamide resins in comparison with layered silicate treated with tetraalkyl ammonium compounds. They further found that mechanical properties and dimensional stability of polyamide resin compositions are considerably improved by the use of triazine-containing layered silicates and a certain polyolefin resin.

The present invention provides polyamide resin compositions, comprising 100 parts by weight of resin contents composed of (A) 60 to 98% by weight of polyamide resins, (B) 40 to 2% by weight of polyolefin resins having dicarboxylic acid anhydride groups, as well as (C) 0.3 to 30 parts by weight of derivatives with at least one positive charge.

The polyamide resins (A) of the present invention are in general polymer compositions having acid amide bond (—CONH—) as repetition units, and are not particularly limited. As representative examples, there are polyamides from lactams, such as polyamide 6, polyamide 12; polyamide 11 from amino undecanoic acid; polyamides from dicarboxylic acid and diamine, such as polyamide 66, polyamide 612, polyamide 46; copolyamides, such as polyamide 6-66, polyamide 6-610; semi-aromatic polyamides, such as polyamide 6T, polyamide 6I, polyamide 6T/6I, polyamide MXD6, obtained from aromatic dicarboxylic acids, such as terephthalic acid (%), isophthalic acid (I), and aliphatic diamines, or from aromatic diamines, such as m-xylylene diamine (MXD), and liphatic dicarboxylic acid. One or more kinds of polyamide resins may be used.

Examples for polyolefin resin having dicarboxylic acid anhydride group (B) according to the present invention, are copolymers of olefin and unsaturated dicarboxylic acid anhydride, or modified polyolefins wherein polyolefin is grated with unsaturated dicarboxylic acid anhydride.

Olefms employed for copolymers of olefins and unsaturated dicarboxylic acid anhydrides are not restricted. They may be ethylene, propylene, 1-butene, 3-methyl-1-butene, 1-hexene, 4-methyl-1-pentene, etc. As examples of unsaturated dicarboxylic acid anhydrides, there are maleic anhydride, itaconic anhydride, citraconic anhydride. Third components may be copolymerized with the copolymer. As concrete examples of the third components, there are unsaturated carboxylic acid esters, such as methyl(meth)acrylate, ethyl(meth)acrylate, butyl(meth)acrylate, 2-ethylhexyl (meth)acrylate. The copolymerisation proportion of said saturated dicarboxylic acid anhydride is normally 0.5 to 5% by weight, preferably 1.0 to 4% by weight. The copolymerisation proportion of the third component is at most 20% by weight, preferably 15% by weight or less.

As modified polyolefin wherein polyolefin is grafted with unsaturated dicarboxylic acid anhydride there are the ones obtained by that homopolymer or copolymer of ethylene of propylene is grat-polymerised with dicarboxylic acid anhydride. The graft content of unsaturated dicarboxylic acid anhydride is preferably 0.01 to 5% by weight, more preferably 0.05 to 4% by weight. As grafting methods, known methods, e.g. melting and kneading by an extruder in the presence of organic peroxide, are employable.

The proportion of component (A) to the combined total of said components (A) and (B), is in the range of 60 to 98% by weight, preferably 65 to 95% by weight, more preferably 65 to 90% by weight. With less than 60% by weight of component (A), the molding process ability is reduced. On the other hand, if the proportion is exceeding 98% by weight, change in dimensions become larger.

The present triazine-containing layered silicate is available from layered silicate and triazine-compound derivatives. The triazine compound derivatives are available by acid-base reaction of triazine compounds and Lewis acid compounds.

A large variety of layered silicates partly of different chemical composition and crystal structure is known. Characteristic of the layered silicates herein is the lamellar crystal structure. Mineralogically they belong to the phyllosilicates. In particular, there are 2:1 phyllosilicates made of two tetrahedral layers and one octahedral layer, and 1:1 phyllosilicates made of one tetrahedral layer and one octahedral layer. Representative minerals of 2:1 phyllosilicates, are smectite, vermiculite, mica, chlorites, and of 1:1 phyllosillictes, kaolin, serpentine, etc. In the smectite group there are saponite, hectorite, sauconite, montinorillonite, beidellite, nontronite, stevensite, etc., and in the vermiculite group, trioctahedral vermiculite, dioctahedral vermiculite, etc. In the mica group are, compositions, such as phlogopite, biotite, lepidlite, muscovite, paragonite, chlorite, margarite, taeniolite, tetrasilicic ica, etc. Those phyllosilicates may be natural products or synthetic ones prepared by means of the hydrothermal method, the melting method, the solid phase method, etc. The layered silicates usable in this invention are not limited to these examples. Tirazine compounds are compounds with six-membered rings containing three nitrogen atoms; preferably are 1,3,5-triazine compounds, specifically melamines, such as melamine, N-ethylenemelamine, N,N',N''-triphenyl melamine, cynuric acids, such as cyanuric acid, isocyanuric acid, trimethylcyanurate, tri(n-propyl (cyanurate, tris)n-propyl)isocyanuarte, diethylcyanuarte, N,N'-diethylisocyanurate, methylcyanurate, methylisocyanuarte, etc. Melamine cyanurates are composed of one equivalent each of melamine compounds and cyanuric acid compounds. The melamine cyanurate compounds are produced for example by than an aqueous solution of melamine and an aqueous solution of cyanuric acid are mixed and reacted under stirring at a temperature of ca. 90 to 10° C.

Lewis acid compounds are electron pair acceptors, e.g. hydroacids, such as hydrochloric acid and hydrogen sulfide, oxo acids, such as sulphuric acid, nitric acid, acetic acid and phosphoric acid, thioacids, such as ethylxantogen acid, etc., alkylhalides an acid halides.

As methods for obtaining the present triazine compound derivatives with positive charge, there are exemplified methods wherein traizine compounds are dissolved in water of alcohol, subsequently, Lewis acid is added thereto and stirring is effected. The incorporation amount of Lewis acid is normally 0.01 to 3 mol, more preferably 0.1 to 2 mol vis-a-vis 1 mol of triazine compounds. The generated triazine compound derivatives are directly employable in solution state, and also an extract may be employed. Alternatively, commercially available products may be directly dissolved in solvents, such as water.

The method for the manufacture of the present triazine-containing layered silicates by blending layered silicates and triazine compound derivatives is not particularly limited. For instance, there are methods where the layered silicates and triazine compound derivatives are brought into contact me means of a medium with affinity to both of them and methods where they are directly blended without the use of a medium. As example for the use of a medium, there is a method wherein the components are dispersed and homogenized in a medium separately, and then mixed under stiring. The solvent is removed to provide the product. As example for the direct blending methods, there is a method where the components are simultaneously put into a ball mill or a mortar, and crushed to provide the product.

The triazine compound derivative amount in triazine-containing layered silicates is in the range of 0.1 to 10 equivalent, preferably 0.3 to 5 equivalent, more preferably 0.5 to 2.0 equivalent of the cation exchange capacity (hereinafter designated as CEC) of the layered silicate. With less than 0.1 equivalent of the triazine compound derivative, the dispersion of the intercalation compound throughout the resin composition is reduced, so that no sufficient mechanical property and dimensional stability during water absorption can be achieved. More than 10 equivalents are not preferable since in that case organic compound is present in excess vis-a-vis the inorganic components, so that mechanical strength and heat resistance of the composite resin material are reduced and mold deposition during molding may occur.

Since the CEC of layered silicates vary depending on the species of the layered silicate, places of production, compositions, etc., the CEC must be previously measured. As measurement method for the CEC, there are usable, for instance, the column permeation method (refer to "Nendo Handbook" second version, edited by Nihon Nendogakkai, pp. 576–577, published by Gihohdoh Shuppan), the methylene blue absorption method (Nihon Kogyokai standard test method, JBAS-107-91) and so on.

The intercalation of triazine compound derivatives into layered silicate can be confirmed by X-ray powder diffraction (XRD) or thermogravimetry (TG/DTA) of triazine-containing layered silicate. Because of the intercalation of triazine compound derivatives, the distance d (001) between layers is increased, and the amount of the derivative contained can be determined by measurement of the weight loss on heating.

The incorporation amount of triazine-containing layered silicates in the present polyamide resin compositions is in the range of 0.3 to 30 parts by weight, preferably 0.5 to 20 parts by weight, more preferably 1 to 10 parts by weight relative to 100 parts by weight of resin component. With less than 0.3 part by weight, the mechanical strength and dimension stability during water absorption are insufficient. With an excess of over 30 parts by weight, the impact resistance is reduced and the molding processability is damaged, so that this is not preferable. Moreover, industrially conventional additives, e.g. anti-oxidants, UV absorbers, flame retardants, lubricants, anti-static additives, colourants and reinforcing agents, may be incorporated in an amount that is not damaging the effect of the present invention.

The methods of blending components (A) and (C) are not particularly limited, examples are melting and kneading the resin components and triazine-containing layered silicates within a melt kneading device, such as continuous mixer, Bunbary mixer, roll, monoaxial extruder, diaxial extruder, tandem-type extruder, etc.

EXAMPLES

Hereinafter, Examples of the present invention are indicated, but the invention is not limited to these Examples.
(1) Dimensional Change
The dimensional change in MD- and TD-direction after 10 hours boiling in boiling water was measured, and the average values were expressin %.
(2) Flexural Modulus
In line with ASTM D790, it was measure at a temperature of 23° C.
(3) Izod Impact Strength
In line with ASTM D256, it was measured at a temperature of 23° C. with a notch. As polyamide resins, polyamide 66 with a relative viscosity (1 g/100 ml polymer solution in 98% by weight sulphuric acid was measured at a temperature 25° C.) of 2.7 (hereinafter designated as "PA-1"), and polyamide 6 with a relative viscosity of 2.7 (hereinafter "PA-2") were employed.

Ethylene-butylacrylate-maleic anhydride tercopolymer (butylacrylate content: 12% by weight; maleic anhydride content: 1.5% by weight) (hereinafter "PO-1") as polyolefin copolymer, and maleic anhydride (0.2% by weight)-grafted polypropylene (hereinafter "PO-2") as modified polyolefin were employed.

Triazine-containing Layered Silicates were Prepared in the Following Manner:
SC-1: 200 g of synthetic sodium tetrasilicic mica (ion exchange capacity: 107 meq/100 g; "SOMASIF ME-100" manufactured by Coop Chemical K.K.) were mixed in 4000 cc of distilled water, and sufficiently swollen. The suspension was heated to 60° C., an aqueous melamine chloride solution was added thereto in an amount of 1 equivalent relative to ion exchange capacity of the layered silicate, the mixture was sufficiently stirred to effect ion exchange reaction. The suspension was filtered, washing and filtration were repeated, and drying and crushing were effected to provide triazine-containing layered silicate was 1.3 NM, and the content of melamine derivative was 10% by weight.
SC-2: In the same manner as above, triazine-containing layered silicate was prepared from 200 g of synthetic sodium tetrasilicic mica, cyanuric acid (160 nmuol) and hydrochloric acid (160 mmol). The layer distance of the obtained triazine-containing layered silicate was 1.3 NM, and the content of the cynuric acid derivtive was 15% by weight.

Examples 1 to 5; Comparative Examples 1 to 3

Components are blended in compositions indicatred in Table 1, the mixture was melted and kneaded at 270° C. by a twin screw extruder to provide pellets. The obtained pellets were molded into plain plates (size: 100×100×2 mm) by the use of an injection molding machine. The results are shown in Table 1.

TABLE 1

| No | Component (A) type | Component (A) blend amount (p.b.w.) | Component (B) type | Component (B) blend amount (p.b.w.) | Component (C) type | Component (C) blend amount (p.b.w.) | dimension ak change (%) | flexural modulus (MPa) | Izod impact strength (J/m) |
|---|---|---|---|---|---|---|---|---|---|
| Example 1 | PA-1 | 75 | PO-1 | 25 | SC-1 | 3 | 0.35 | 2700 | 37 |
| Example 2 | " | " | " | " | " | 7 | 0.25 | 3600 | 20 |
| Example 3 | " | " | " | " | SC-2 | 3 | 0.37 | 2500 | 32 |
| Example 4 | PA-2 | " | " | " | SC-1 | 3 | 0.47 | 2650 | 42 |
| Example 5 | PA-1 | " | PO-2 | " | " | 3 | 0.34 | 4200 | 32 |
| Comparative Example 1 | PA-1 | 75 | PO-1 | 25 | — | — | 0.72 | 1600 | 190 |
| Comparative Example 2 | " | 100 | — | — | SC-1 | 3 | 0.61 | 4400 | 30 |
| Comparative Example 3 | " | 50 | PO-1 | 50 | " | 3 | 0.3 | 1100 | 105 |

Since present polyamide resin compositions have good mechanical properties and dimensional stability during water absorption, they are suitably employed for various industrial parts, such as electrical components, electric parts, automobile components, aircraft parts, machine parts, and are useful.

What is claimed is:

1. Polyamide resin composition, comprising 100 parts by weight of resin contents composed of (A) 60 to 98% by weight of polyamide resin, (B) 40 to 2% by weight of polyolefine resin having dicarboxylic acid anhydride groups, as well as (C) 0.3 to 30 parts by weight of triazine-containing layered silicate with intercalated triazine compound derivatives with at least one positive charge.

2. Polyamide resin composition according to claim 1, wherein the triazine-containing layered silicate contains 0.1 to 10 equivalent amount of triazine compound derivatives vis-a-vis the cation exchange capacity of the layered silicate.

* * * * *